Jan. 17, 1928.  
R. PALMER  
1,656,755  
METHOD OF AND APPARATUS FOR REMOVING COVERINGS FROM CORES  
Filed Dec. 9, 1924  
3 Sheets-Sheet 1
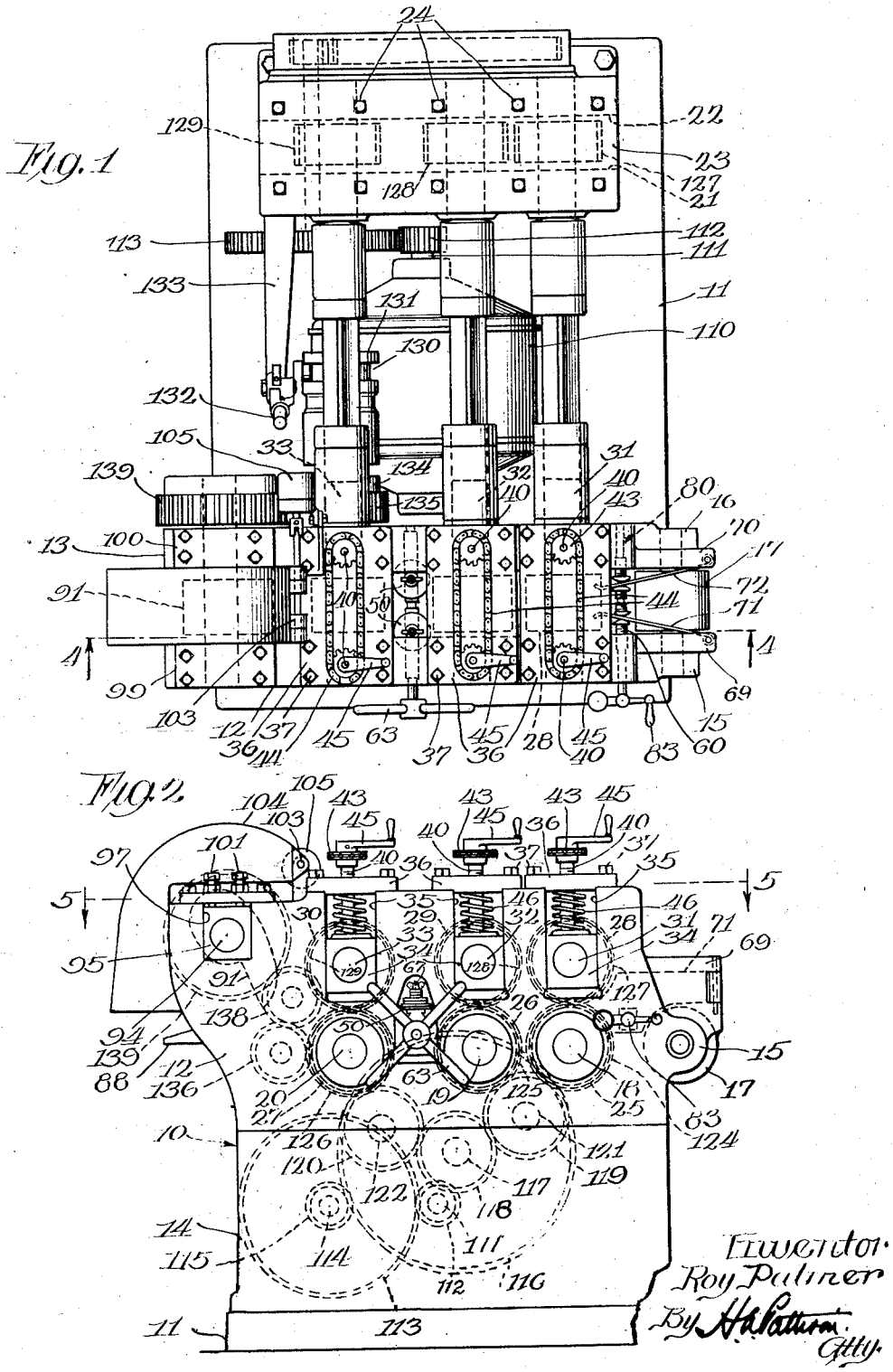

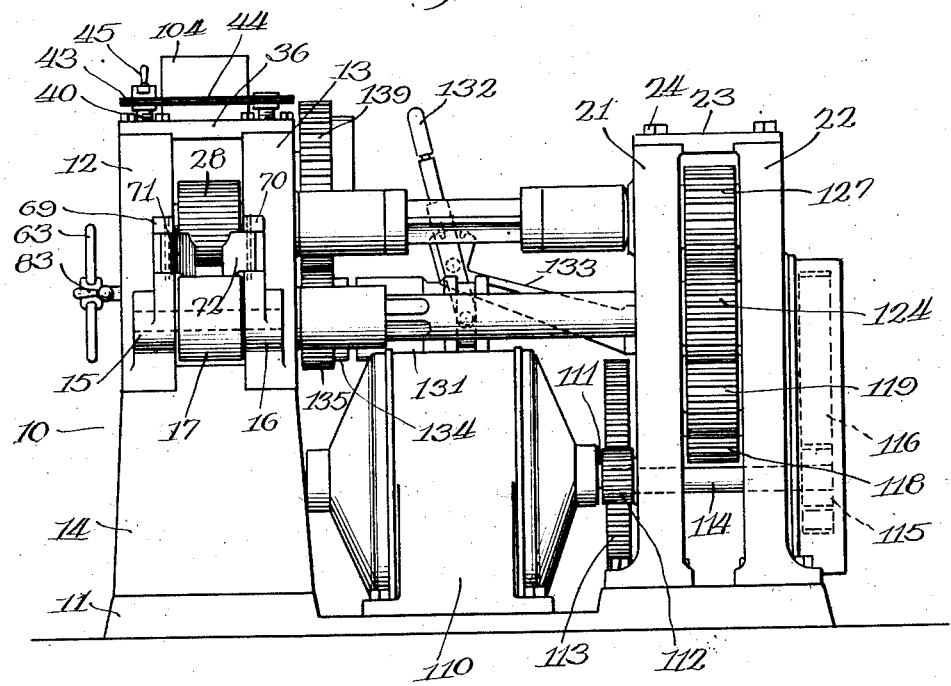
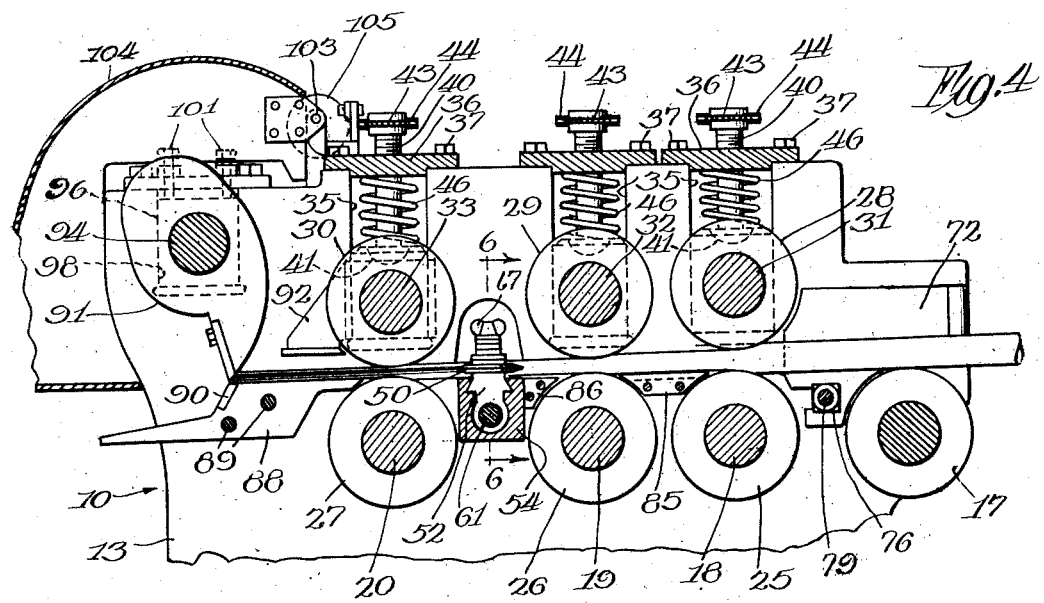

Jan. 17, 1928.  1,656,755
R. PALMER
METHOD OF AND APPARATUS FOR REMOVING COVERINGS FROM CORES
Filed Dec. 9, 1924   3 Sheets-Sheet 3
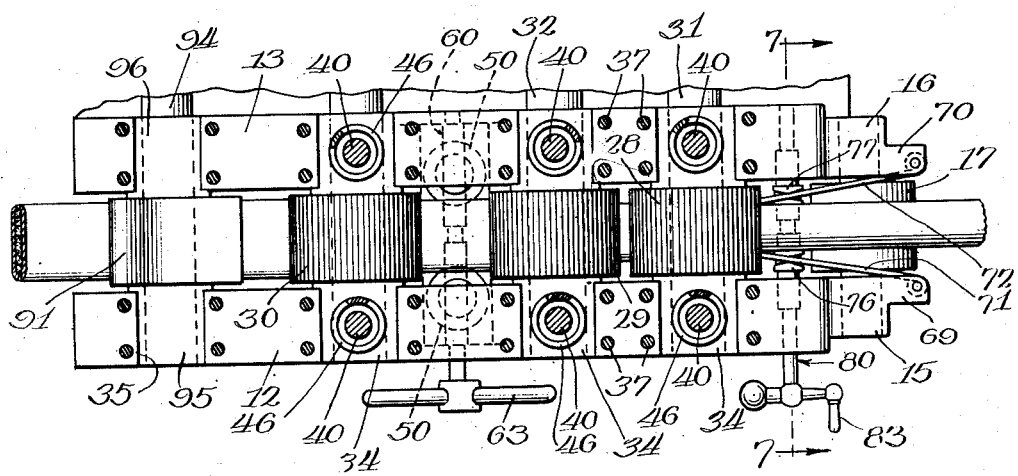
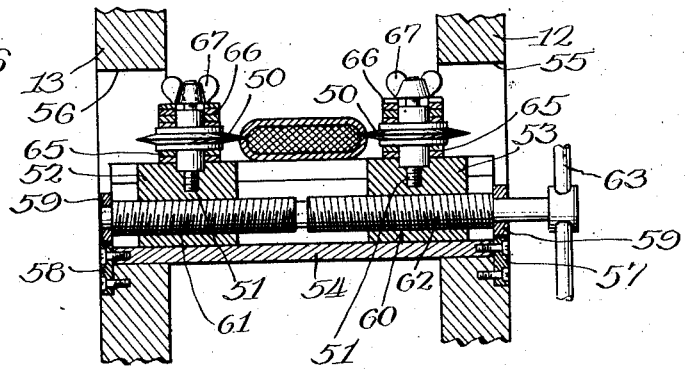
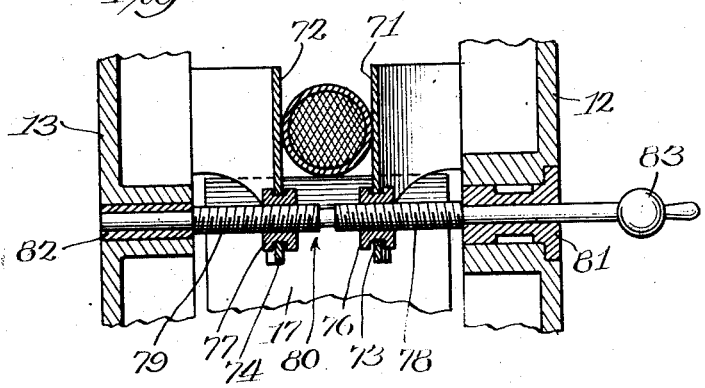
Inventor
Roy Palmer
By H.A. Pattison
Atty.

Patented Jan. 17, 1928.

1,656,755

UNITED STATES PATENT OFFICE.

ROY PALMER, OF CHICAGO, ILLINOIS, ASSIGNOR TO WESTERN ELECTRIC COMPANY, INCORPORATED, OF NEW YORK, N. Y., A CORPORATION OF NEW YORK.

METHOD OF AND APPARATUS FOR REMOVING COVERINGS FROM CORES.

Application filed December 9, 1924. Serial No. 754,749.

This invention relates to a method of and apparatus for removing the covering from a core, and more particularly to a method of and apparatus for removing the sheath or outer casing from lead covered cables.

When sheathed cores, such as telephone cables, comprising a plurality of insulated electrical conductors enclosed within a lead sheath, become damaged so that they are no longer serviceable, it is advantageous, in order to reduce the loss to a minimum, to disintegrate them so that the various materials entering into their manufacture may be reclaimed for reuse. Also, in some instances, it may be desirable to remove the sheath from a core for the purpose of more readily repairing a defect, either in the core or in the sheath.

The primary object of the present invention is to provide an improved method of and apparatus for removing the covering from a core, and more particularly to an improved method of and apparatus for stripping the sheath or outer casing from lead covered cables.

Another object of this invention is to provide an improved method of and apparatus for disintegrating covered cores to facilitate the reclamation of the materials contained therein.

Other objects and advantages will become apparent in the following detailed description and the novel features of the invention will be particularly pointed out in the appended claims.

One form of the invention may be embodied in a machine for removing the sheath or casing from lead covered cables wherein the cable is passed lengthwise through a series of compression rolls which serve to straighten the cable and loosen the core from the outer casing. The cable is then passed between a plurality of cutters which split the casing lengthwise into a plurality of strips. The split casing together with the core is then cut into short lengths to facilitate the handling thereof.

In the accompanying drawings, which illustrate one specific embodiment of the invention, Fig. 1 is a plan view of a machine embodying the novel features of this invention;

Figs. 2 and 3 are front and end elevations, respectively, of the structure shown in Fig. 1;

Fig. 4 is an enlarged vertical section taken on the line 4—4 of Fig. 1, the lower portion of the frame being broken away;

Fig. 5 is an enlarged fragmentary section taken approximately on the line 5—5 of Fig. 2;

Fig. 6 is a fragmentary section taken on the line 6—6 of Fig. 4, illustrating the adjusting mechanism for the cutting apparatus, and Fig. 7 is a fragmentary section taken on the line 7—7 of Fig. 5, illustrating the mechanism for guiding the cable to the feed and compression rolls.

Although the invention is herein illustrated and described in connection with a method of and apparatus for removing the sheath from lead covered cables, it should be understood that the novel features thereof are capable of other applications and should be limited only by the general scope of the appended claims.

Referring now to the drawings in detail, wherein like reference characters designate like parts throughout the several views, 10 indicates generally the main supporting frame of the machine which is suitably supported on a base member 11, and comprises a pair of parallel upright members 12 and 13, which are formed integral with a lower cross piece 14. Revolvably mounted in bearings 15 and 16, formed at one end of the members 12 and 13, respectively, is an idler roll 17 which serves as a supporting and guiding means for feeding the cable through the machine. Shafts 18, 19 and 20 are revolvably journaled at one end in suitable stationary bearings formed in the frame members 12 and 13 and are supported at their opposite ends in suitable bearings formed in upright supporting members 21 and 22, secured to the base member 11. The upper ends of the upright members 21 and 22 are interconnected by means of a cap or cross piece 23, which is held in place by means of machine screws 24.

Corrugated rolls 25, 26 and 27, hereinafter referred to as the lower feed and compression rolls, are secured to the shafts 18, 19 and 20, respectively, and are positioned between the upright frame members 12 and 13. Upper feed rolls 28, 29 and 30, also corrugated, are secured to shafts 31, 32 and 33, respectively, which shafts are journaled in bearing boxes 34, 34, positioned on either side of the rolls. The bearing boxes 34 are movable vertically in slots 35, 35 formed in the top of the frame members 12 and 13 directly above the shafts 18, 19 and 20. Cross pieces 36, 36 are positioned above the slots 35 and are secured to the top of the frame members 12 and 13 by means of machine screws 37. The upper rolls 28, 29 and 30 are adjustable towards and way from the lower rolls 25, 26 and 27, respectively, in order to accommodate cables of various sizes. This is accomplished by means of adjusting screws 40, 40 having enlarged semi-spherical portions 41 at their lower ends engaging the top of the bearing boxes 34, and having threaded portions where they pass through the cross pieces 36.

Referring particularly to Figs. 1 and 5, it will be noted that each upper roll is provided with two adjusting screws 40, one engaging each bearing box 34. Secured to the upper end of each adjusting screw 40 is a sprocket 43. Each pair of sprockets is engaged by a chain 44 so that by turning one of the adjusting screws to raise or lower an upper roll, the other adjusting screw will simultaneously turn through the same distance, thereby maintaining the upper feed rolls substantially parallel to the lower feed rolls. A suitable hand lever 45 secured to the upper end of one of each pair of adjusting screws 40 serves as a means for adjusting the upper roll towards or away from the lower roll. Encircling each adjusting screw and interposed between the cross pieces 36 and the top of the bearing boxes 34 are compression springs 46 which serve to urge the upper rolls toward the lower rolls.

While passing between the feed and compression rolls, the cable is flattened as clearly illustrated in Figs. 4 and 5. This serves to loosen the core from the outer casing, thereby facilitating the disintegration of the materials therein.

A pair of oppositely disposed circular cutters 50 (Fig. 6) are revolvably mounted between the rolls 29 and 30 and are arranged with their cutting edges in a horizontal plane midway between the upper and lower feed rolls. As clearly shown in Fig. 6 the cutters 50 are adjustable both horizontally and vertically to accommodate cables of various sizes, and also to vary the depth of their cut. Each cutter is revolvably mounted on a vertical stud 51, one of which studs is threaded or otherwise secured to a bearing 52, while the other is secured to a bearing 53. The bearings 52 and 53 are slidably mounted in a horizontal track or guide member 54 which is journaled in slots 55 and 56 formed in the frame members 12 and 13, respectively. The guide member 54 is held against horizontal displacement by end plate members 57 and 58 secured to the frame members 12 and 13, respectively. Passing through the bearings 52 and 53 and revolvably journaled in bearings 59 secured at either end of the guide member 54 is an adjusting rod 60 having right hand and left hand threaded portions 61 and 62 which engage corresponding right hand and left hand threaded bores formed in the bearings 52 and 53, respectively. By this construction it is apparent that by turning the adjusting rod 60 either to the right or to the left, the cutters 50 are moved either towards or away from each other. A hand wheel 63 is provided at one end of the adjusting rod 60 for turning it to adjust the cutters for cables of various diameters.

Encircling the studs 51 and interposed between the cutters 50 and the top of the bearings 52 and 53 are a plurality of washers 65 of various thicknesses. A plurality of similar washers 66 encircle the studs 51 immediately above the cutters 50 and are held in place by means of thumb nuts 67 threaded on the upper ends of the studs 51 (Fig. 6). By removing the thumb nuts 67 and interchanging the washers 65 and 66, the cutters 50 may be either raised or lowered on the studs 51 to accommodate a cable of a predetermined diameter.

Pivotally supported, at one end, in bifurcated portions 69 and 70 formed at the forward ends of the frame members 12 and 13, are guide plate members 71 and 72 which form a receiving throat and serve to center the cable between the cutters 50 as it passes between the feed rolls. This insures that the depth of the cut made by both cutters is practically the same and substantially uniform throughout the entire length of the cable. The guide members 71 and 72 are adjustable horizontally by mechanism similar to that employed for adjusting the cutters 50. The free ends of the guide members 71 and 72 are slotted at 73 and 74, respectively, and engage bifurcated bushings 76 and 77, respectively, as clearly shown in Fig. 7. The bushings 76 and 77 are provided with right hand and left hand threaded bores which engage corresponding right hand and left hand threaded portions 78 and 79 of an adjusting screw 80. The adjusting screw 80 is revolvably journaled in bearings 81 and 82 secured to the frame members 12 and 13, respectively, and is provided at one end with a handle 83 to facilitate turning it to adjust the guide members 71 and 72 so as to accommodate cables of various diameters.

Positioned between the lower feed rolls 18 and 19 and secured to the frame members 12 and 13 is a horizontal guide member 85 (Fig. 4) which serves to guide the cable from the first set of rolls 25 and 28 to the second set of rolls 26 and 29. A similar guide member 86 is secured to the frame members 12 and 13 between the lower roll 26 and the cutting mechanism, and serves to guide the cable as it leaves the second set of rolls 26 and 29 and passes between the cutters 50 to the third set of rolls 27 and 30.

Upon leaving the last set of rolls 27 and 30, the cable passes over a horizontal platform or block 88 which is rigidly secured to the frame members 12 and 13 by suitable machine screws 89. A stationary knife 90 is removably secured to the edge of the block 88 and cooperates with a revolving chopper 91 to cut the cable core and the slit sheath into suitable lengths to facilitate handling thereof. A guide member 92 (Fig. 4) encircling the shaft 33, and secured to the frame members 12 and 13 serves as a guide for the slitted cable as it passes from the rolls 27 and 30 over the block 88.

The chopper 91 is secured to a shaft 94 which is revolvably journaled in bearings 95 and 96 mounted in vertical slots or openings 97 and 98 formed in the frame member 12 and 13, respectively. Cross pieces 99 and 100 are secured to the top of the frame members 12 and 13, respectively, directly above the bearings 95 and 96. Threaded through the cross pieces 99 and 100 and engaging the top of the bearings 95 and 96 are a plurality of set screws 101 by means of which the chopper 91 may be adjusted vertically to take up wear on the bearing surfaces.

The chopper and feed rolls may be driven from any suitable source of power, such as an electric motor 110, through a main drive shaft 111 (Figs. 1 and 3). A pinion 112 is secured to the shaft 111 and drives a large gear 113 which is keyed to a shaft 114 (Fig. 2). A spur pinion 115 is also keyed to the shaft 114 and meshes with a large spur gear 116 to drive a shaft 117. A spur gear 118, which is much smaller than the gear 116, is keyed to the shaft 117 and meshes with gears 119 and 120 secured to stud shafts 121 and 122, respectively. The gear 119, in turn, meshes with gears 124 and 125 secured to the shafts 18 and 19, respectively, thereby positively driving the lower feed rolls 25 and 26, and the gear 120 meshes with a gear 126 secured to the shaft 20, thereby positively driving the lower feed roll 27. The upper feed rolls 28, 29 and 30 are driven through gears 127, 128 and 129, respectively, which are secured to the shafts 31, 32 and 33 and mesh with the gears 124, 125 and 126, respectively.

The above described gearing is of a well known type commonly used when it is required to operate a machine at a speed considerably lower than the speed of the motor, and for this reason it is thought that a detailed description thereof is unnecessary.

Inclosing the chopper 91 and suitably hinged at 103 to the framework of the machine is a guard 104 which serves to protect the operator from possible injury while the machine is in operation. The guard 104 is connected to an electric switch 105 so that when it is opened to expose the chopper 91, the motor 110 is automatically shut down. By this construction it is impossible to operate the machine unless the guard is closed, thereby insuring the safety of the operator.

The chopper 91 is driven from the shaft 20 which is provided with a clutch 130 whereby the machine may be operated either with or without the chopping mechanism. When the machine is used for disintegrating junked cables, the chopper 91 is continuously driven, thereby cutting the split casing and core into predetermined uniform lengths. On the other hand, when the sheath is removed for the purpose of repairing, the chopper is not used.

The driving member 131 of the clutch 130 is keyed to the shaft 20 and is slidable thereon by means of a hand lever 132 pivotally supported in a bracket 133 secured to the frame member 21. Secured to the driven member 134 of the clutch 130 is a gear 135 which meshes with an idle gear 136. The gear 136 meshes with a second idle gear 138 which, in turn, meshes with a gear 139 secured to the shaft 94, thereby driving the chopper 91.

What is claimed is:

1. The method of removing the casing from a lead covered cable, which consists in subjecting the cable to a pressure sufficient to loosen the core from the casing, splitting the casing lengthwise into a plurality of strips, and then cutting said strips into predetermined lengths.

2. The method of removing the casing from a lead covered cable, which consists in subjecting the cable to a pressure sufficient to loosen the core from the casing, splitting the casing lengthwise into a plurality of strips, and then cutting the casing and the core into predetermined lengths.

3. In a cable stripping machine, a plurality of feed rolls adapted to flatten the cable so as to loosen the core from the outer casing, and means for splitting the casing lengthwise into a plurality of strips.

4. In a cable stripping machine, a plurality of feed rolls adapted to flatten the cable so as to loosen the core from the outer casing, means for splitting the casing lengthwise, and means for cutting the split casing into predetermined lengths.

5. In a cable stripping machine, a cable receiving throat, means for adjusting said throat to accommodate various sizes of cables, a plurality of feed rolls adapted to move the cable through said throat and simultaneously subject it to a pressure sufficient to flatten the core and loosen it from the outer casing, and means for splitting the casing lengthwise into a plurality of strips.

6. In a cable stripping machine, a cable receiving throat, means for moving the cable through said throat and simultaneously subjecting it to a pressure sufficient to loosen the core from the outer casing, a plurality of circular cutters revolvably mounted within said throat and adapted to split the casing lengthwise into a plurality of strips, and means for cutting the strips into predetermined lengths.

7. In a cable stripping machine, a cable receiving throat, a plurality of corrugated feed rolls adapted to move the cable through said throat and simultaneously subject it to a pressure sufficient to loosen the core from the outer casing, means for adjusting said feed rolls to accommodate various sizes of cables, a plurality of circular cutters adapted to split the outer casing lengthwise into a plurality of strips, means for adjusting said cutters for cables of various diameters, and a revolving knife adapted to cut the core and the split casing into predetermined lengths.

In witness whereof, I hereunto subscribe my name this 29 day of November, A. D. 1924.

ROY PALMER.